July 16, 1957
M. IRELAND
2,799,217
THERMAL TIMER CONSTRUCTION FOR TOASTER
Filed April 10, 1953
3 Sheets-Sheet 1
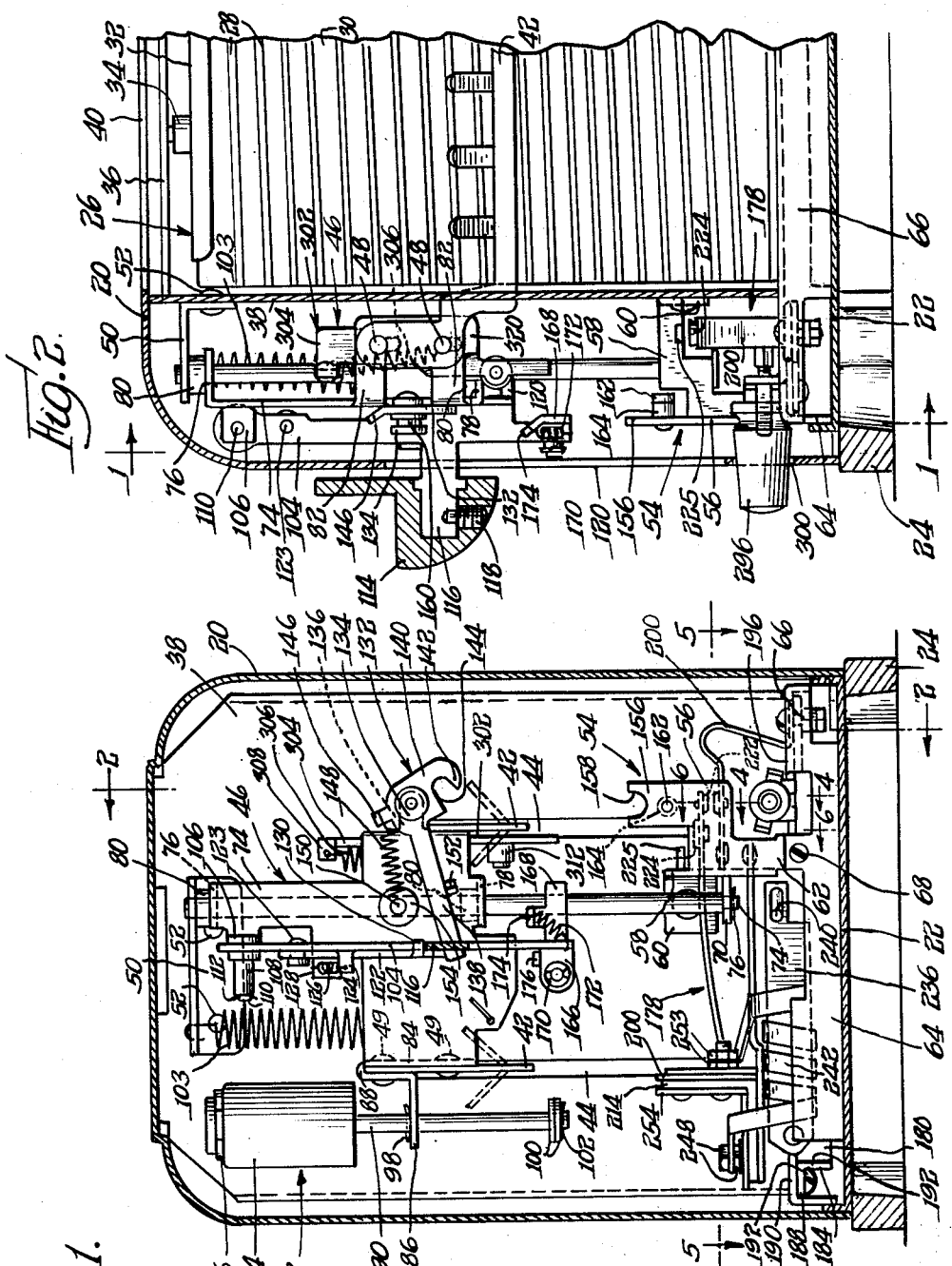
INVENTOR.
Murray Ireland
BY
Karl H. Sommermeyer
Atty.

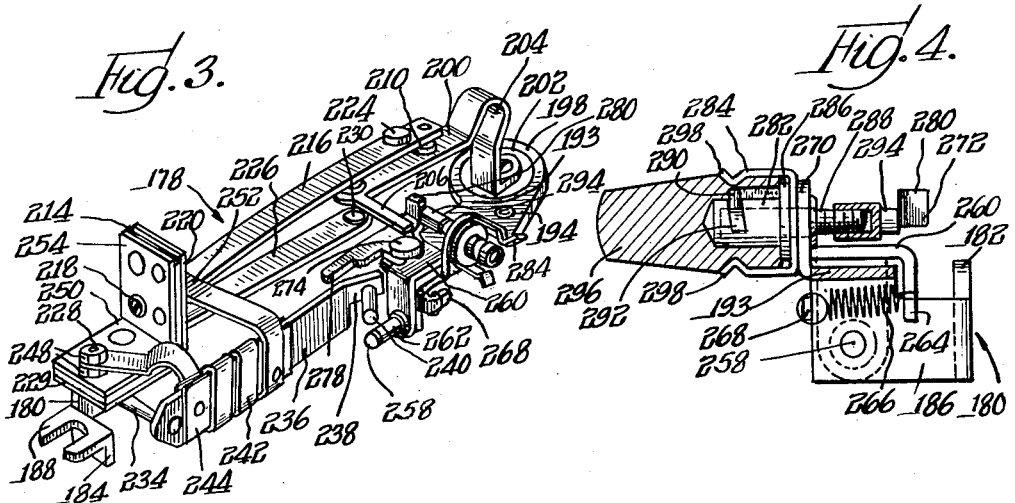

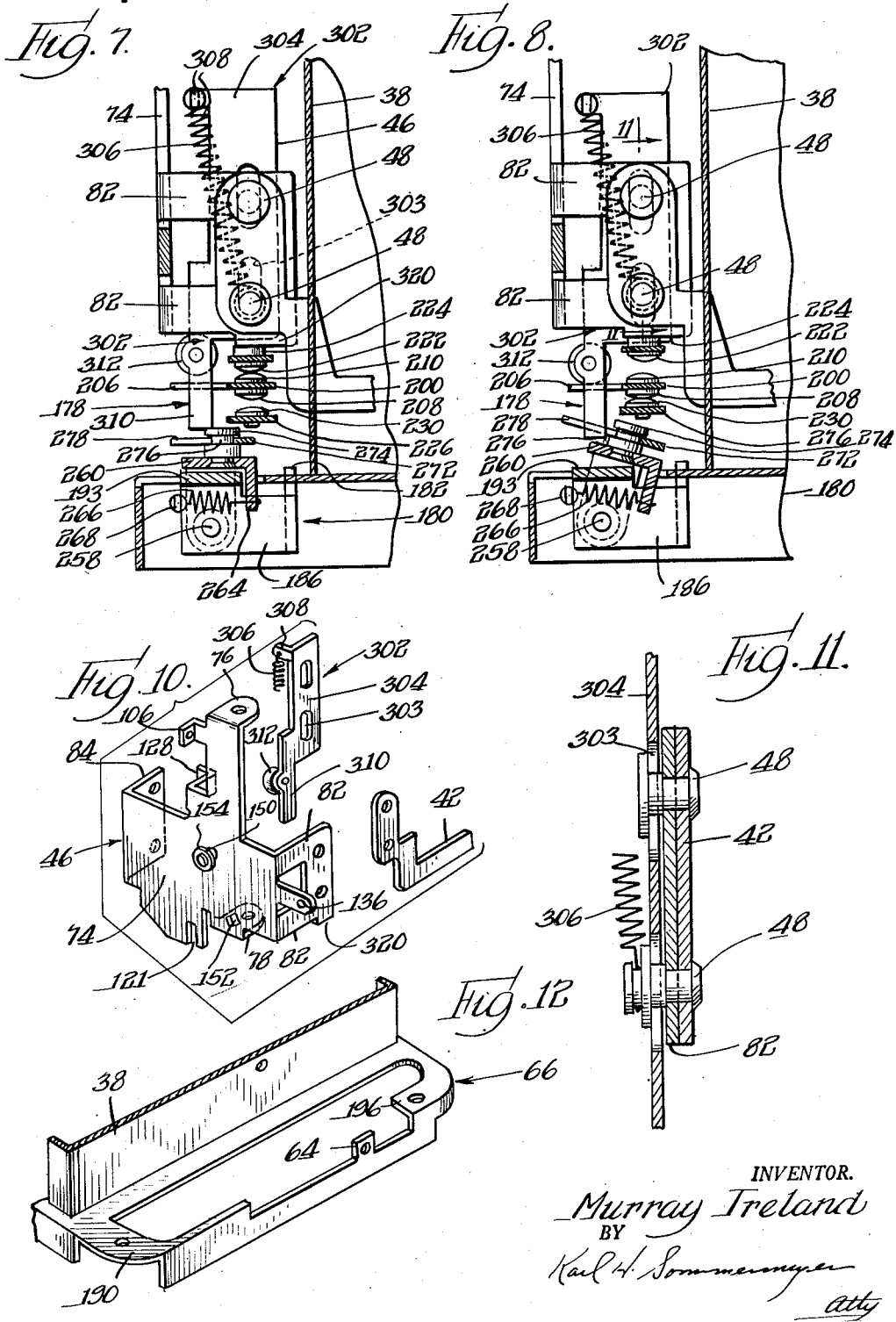

United States Patent Office 2,799,217
Patented July 16, 1957

2,799,217

THERMAL TIMER CONSTRUCTION FOR TOASTER

Murray Ireland, Elgin, Ill., assignor to McGraw-Edison Company, a corporation of Delaware Application April 10, 1953, Serial No. 347,937

6 Claims. (Cl. 99—329)

This invention is concerned generally with automatic toasters, and more particularly with thermal timers for automatic electric toasters.

Various types of timers have been used heretofore for automatically timing and controlling the preparation of toast. Thermal timers employing bimetallic thermostatic strips, and more especially those operating on a two-part or double-acting cycle, have generally been among the most satisfactory because they are simple, rugged, and reliable, and because they can automatically compensate for considerable variation in temperature of the toaster and voltage of electric power supply. One successful two-part cycle for a toaster-timer is the heat-up cool-off cycle wherein a thermal member such as a bimetal strip is heated and then cooled as, for example, that shown in Patent 2,234,759. Another is the heat-up heat-up cycle shown in Patent 2,076,774.

The general object of this invention is to provide, in a toaster, a new and improved thermal timer of the double acting type.

Another object of this invention is to provide an improved thermal timer mechanism of the foregoing type which is simple and compact and easily installed and assembled with a toaster.

A further object of this invention is to provide a bimetallic toaster timing mechanism for a pop-up toaster or the like wherein all of the various switch contacts are supported on the stationary frame of the toaster and are actuated by parts fixedly and slideably carried by the carriage.

More specifically, an object of this invention is to provide, in a toaster, a thermal timing mechanism having a switch operating tappet resiliently mounted on the carriage and having its downward movement limited by a movable stop.

Yet another object of this invention is to provide, in a thermal timing mechanism for a toaster, a movable stop for a switch actuating member, said movable stop having an evener-like bar for adjusting the required motion of a bimetallic strip.

Other and further objects and advantages of the present invention will be apparent from the following description when taken in connection with the accompanying drawings wherein:

Figure 1 is an end view of the toaster partly in section, showing the timing and latching mechanism, and constituting substantially a section along the line 1—1 of Fig. 2;

Fig. 2 is a vertical sectional view taken substantially along the line 2—2 of Fig. 1;

Fig. 3 is a perspective view of the thermal timing mechanism;

Fig. 4 is a cross-sectional view taken substantially along the line 4—4 of Fig. 1 and showing the mechanism for manually varying the toasting time;

Fig. 5 is a top view of the thermal timing mechanism as taken substantially along the line 5—5 of Fig. 1;

Fig. 6 is an exploded perspective view of the thermal timing mechanism;

Fig. 7 is a vertical sectional view through the switch contacts and actuating members therefor as taken substantially along the line 7—7 of Fig. 1;

Fig. 8 is a view similar to Fig. 7 showing the mechanism in a different position of its operation;

Fig. 9 is a schematic wiring diagram of the toaster and thermal timing mechanism;

Fig. 10 is an exploded view showing the carriage and certain parts carried thereby;

Fig. 11 is a vertical partial section taken at 11—11 in Fig. 8; and

Fig. 12 is a perspective view of the end portion of the frame that carries the thermal timing mechanism.

Referring first to Figs. 1 and 2 for a general understanding of my invention, there may be seen toaster parts of known construction including a sheet metal casing 20 having a sheet metal bottom 22 provided with one or more plastic support pieces 24 for spacing the metal parts of the toaster a sufficient distance above a supporting table or the like. The toaster is provided with the usual electric toasting elements 26 comprising resistance wire 28 wound on mica sheets 30, the mica sheets 30 being supported in any convenient manner such as by metal clamp members 32 carried by insulating members 34 on metal strips 36 extending between vertical end plates 38 (only one shown).

The casing 20 is provided at its top with a pair of elongated openings 40 for inserting and removing slices of bread, and the usual toast carrying trays 42 are received between opposed pairs of heating elements 26 in line with the openings 40. The toasting trays 42 extend at one end through slots 44 and are connected to a carriage 46 by any suitable means such as rivets 48.

An angle bracket 50 is secured to the end plate 38 that is shown in Figs. 1 and 2 by means such as rivets 52. A sheet metal bracket 54 is secured at the bottom of the plate 38. The bracket 54 has a front wall 56, a rearward extending strip 58 arranged at right angles thereto, and a rear tab 60 parallel to the front wall 56 and riveted or otherwise secured to the end plate 38. The front wall 56 is provided with a depending tab 62 fixed to a flange 64 of a sheet metal frame 66 by means such as a screw 68, the sheet metal frame 66 resting on the bottom plate 22 and carrying the end plates 38.

A horizontally extending ear 70 on the rearward extending strip 58 of the bracket 54 is provided with an aperture aligned with an aperture in the upper bracket 50, and a carriage mounting rod 72 is fixed in these apertures by any suitable means such as a reduced lower end portion 74 fitting through the aperture in the ear 70 and carrying a wire clip member 76 in an annular groove below the ear.

The carriage 46 (Figs. 1, 2 and 10) comprises a vertical front plate 74 having a horizontal flange 76 at its upper end, and a horizontal flange 78 adjacent the bottom edge. The flanges are provided with aligned apertures which receive bronze bushings 80 slideably mounted on the carriage mounting rod 72. The right edge (as viewed in Fig. 1) of the carriage plate 74 is provided with a pair of fingers 82 (Fig. 2), turned back at a right angle to plate 74, joined at their outer ends by an integral strip, and receiving the rivets 48 to secure the right toasting tray 42 to the carriage. The left edge (as viewed in Fig. 1) of the carriage 46 is provided with a right angle flange 84 to which the left toast carrying tray 42 is secured by a pair of the rivets 49. Thus the toast carrying trays 42 move up and down with the carriage 46.

The upper rivet 49 (Fig. 1) also secures an angle bracket 86 on the flange 84, the upper end of the angle bracket 86 being turned over at 88 for additional stability. The angle bracket is provided with an aperture slideably receiving the piston rod 90 of a dash pot mechanism 92. The dash pot mechanism may be of suitable construction and includes a cylinder 94 secured on the end plate 38 by a bracket 96. A piston, which preferably includes a valve (not shown) so that it moves down more readily than up, is received in the cylinder 94 and is suitably secured to the rod 90. For moving the rod 90, the bracket 86 abuts a wire clip 98 received in an annular groove above the bracket 86 and washers 100 secured on the lower end of the piston rod by means of a similar wire clip 102. The spacing of wire clip 98 and washers 100 provides a lost motion connection between the dash pot and the carriage.

A coil spring 103 (Figs. 1 and 2) is stretched between the horizontal flange of the stationary bracket 50 and an aperture near the bottom of the plate 74 of the carriage 46, the ends of the spring being secured in any desirable manner. The spring thus urges the carriage toward its upper position which is determined by abutment of the bronze bushing 80 at the top of the carriage against the horizontal flange of the angle bracket 50. A latch mechanism is mounted on the carriage and includes an elongated lever 104 (Fig. 2) journaled at its upper end on an ear 106 extending forward at right angles from the bracket plate 74. An elongated bronze bushing 108 (Fig. 1) is fixed to the lever 104, fits over an elongated stud 110 fixed on the ear 106. A spring clip 112 fitting in an annular groove on the end of the stud 110 prevents the bushing from slipping off the end of the stud. This construction prevents lateral play of the lever 104.

A handle 114 of molded plastic or other thermal insulating material is suitably secured on a forward extending projection 116 of the lever 104 as by a set screw 118. The projecting member 116 extends out of the toaster casing through a vertical slot 120 for moving the toast carrying trays up and down. A prong 120 (Fig. 2) extends inward from near the bottom of the lever 104 through a slot 121 (Fig. 10) in the plate 74 and is provided at its inner end with a twisted ear (not shown) for limiting outward movement of the handle 114 and lever 104.

A catch 122 (Fig. 1) in the form of an elongated finger is pivoted on a rivet or the like 123 near the upper end of the lever 104 and is provided at its lower end with a tooth (not shown) facing the carriage plate 74 and having a horizontal upper edge and a beveled lower edge. A lug 124 extends from the left side of the catch 122 and a coil spring 126 is stretched between this lug and a flange 128 carried by the carriage plate 74 and offset therefrom toward the end plate 38. A lug 130 extends from the right side of the catch 122 and abuts the lever 104 to limit movement of the catch 122 toward the plate 74 under the influence of the spring 126.

A hook 132 is pivoted on a stud 134 fixed on an ear 136 extending from the side of the plate 74 and struck out from between the fingers 82. The hook comprises a straight shank 138 extending past the lever 104 and catch 122 and between the lever and the carriage plate 74. A finger 140 extends at an obtuse angle to the shank 138 from the pivot 134 and includes a tip or hook-like tooth 142 which is spaced from a cam surface 144. The hook 132 is provided with an upward and outward extending lug 146, and a coil spring 148 is stretched between this lug and a stud 150 on the plate 74. This normally swings the hook to the position shown in Fig. 1 where it stops against projection 152 struck out of the carriage plate 74. A washer 154 is secured on the stud 150 outward of the plate 74 a sufficient distance to allow the shank 138 to pass behind the washer and against the stud which serves as a stop for it.

The front wall 56 of the bracket 54 is provided with an upstanding portion 156 underlying the pivotal mount 134 of the hook 132. The top of the upstanding portion 156 is provided with a recess 158 which is slightly greater than a semicircle. This recess is in position to receive a reduced neck portion 160 of the stud 134 when the carriage 46 is moved to its lower position.

A headed stud 162 (Fig. 2) projects back from the upward extending portion 156 of the bracket 54 toward the end plate 38 and rotatably carries a roller 164. This roller is in position to engage the cam surface 144 of the hook 132 as the carriage is lowered to pivot the hook in a clockwise direction to cause the tooth 142 to swing beneath the roller to hold the carriage and toast carrying trays in lowered position, the shank 138 of the hook passing over and catching above the tooth (not shown) of the catch 122 during such clockwise rotation to lock the hook in its clockwise rotated position with the tooth 142 beneath the roller 164. The angle of the upper face of tip 142 of the hook 132 is such that the upward force of the carriage spring 103 tends to turn hook 132 counterclockwise as seen in Figs. 1, 3 and 4 for disengaging it from the roller 164. Thus, both this action and the spring 148 tend to disengage hook 132 for releasing the carriage. In the lowered position of the mechanism (Fig. 4), groove 160 (Figs. 2 and 3) of stud 134 on the carriage lies in the recess 158 to hold the mechanism in alignment particularly for preventing the forces acting between tip 142 of hook 132 and roller 164 from distorting the mechanism enough for letting those parts slip past each other.

The remainder of the latching mechanism comprises a laterally extending ear 166 (Fig. 1) on the bottom of the lever 104. A trip lever 168 is journaled on the ear 166 by means of an elongated stud and bushing connection 170 to prevent side play. A coil spring 172 is stretched between the bottom end of the lever 104 and a deflected tab 174 on the upper edge of the trip lever 168. A lug 176 on the upper edge of the trip lever and overlying the ear 166 limits clockwise rotation of the trip lever 168 under the influence of the spring 172.

The toaster further is provided with my improved thermal timing mechanism with which this application is particularly concerned, and which is designated by the numeral 178 and shown in general in Figs. 1 and 2 and more particularly in Figs. 3–11. The thermal timing mechanism 178 comprises a transverse, relatively rigid frame 180 of sheet metal, part of this frame having been omitted from Fig. 3 for clarity. The frame 180 is provided with a spacer bar 182 extending parallel to the end plate 38. The spacer bar 182 is arranged in a vertical plane and is provided at its opposite ends with right angularly disposed walls 184 and 186, these walls also lying in vertical planes. A spade lug 188 extends horizontal from the top edge of the wall 184 and is secured against the under side of a horizontal portion 190 (Figs. 1 and 12) of the frame 66 by means of a screw 192 (Figs. 1 and 5) for supporting the timer in the toaster frame.

The frame 180 further includes a horizontal plate 193 extending from the top edge of the wall 186. This plate is provided with an apertured mounting ear 194 to be held against the under side of another horizontal portion 196 of the frame 66 (Figs. 1 and 12) by means such as a screw (not shown) passing through the ear and threaded into an aperture in the horizontal portion 196. The horizontal plate 193 further includes an enlarged portion 198 which supports a spring metal contact leaf 200 by means of any suitable insulated connection including two insulating discs of which one is shown at 202. The contact leaf spring 200 is provided with a U-shaped portion 204 for improved flexibility, and also with a lateral extending switch operating arm 206 at its free end. A contact button 208 is provided on the under side of the leaf 200 at its free end adjacent the switch actuating arm 206. Another contact button 210 is carried on top of the leaf intermediate the contact 208 and the U-shaped portion 204.

The frame 180 further comprises an upward extension 212 of the bar 182 at the left end thereof, and this upward extension is provided with an integral angle bracket 214. A contact carrying leaf spring 216 is secured on the vertical flange of this angle bracket 214 by means such as a rivet and a screw 218 (Fig. 3) and is electrically insulated from the bracket by means of insulating plates 220 and 254. The leaf 216 extends out over the leaf 200 and carries on its under side at its free end a contact button 222 (Figs. 1, 6 and 7) aligned with the contact button 210 on the leaf 200. The leaf 216 further carries on its top surface, and spaced in a short distance from the end, an actuating button 224 of suitable insulating material such as porcelain. A lug 225 (Figs. 1 and 2) on the strip 58 overlies the porcelain button 224 for limiting upward motion of leaf 216.

An additional contact carrying leaf 226, this leaf being relatively rigid as compared with the flexibility of the leaves 200 and 216, is secured to the under side of the angle bracket 214 by any suitable means such as a rivet and a screw 228, and insulating sheets 229 and 250. The leaf 226 is provided at its outer end with an upward facing contact button 230 aligned with the contact button 208 on leaf spring 200. The leaf 226 is provided with an offset portion 232 (Fig. 6) which is apertured for receipt of a screw for the attachment of an electrical supply conductor (not shown) to the leaf.

A stud 234 extends forward from the left end of the bar 182 and carries a bimetallic strip 236 at its outer end. The bimetal strip is arranged substantially parallel to the bar 182 and is provided at its unsupported, right end with an outward deflected finger 238 which carries an elongated actuating pin 240. The actuating member 240 preferably comprises a hollow cylinder threaded onto a stud for adjustment of the position of the member 240.

A ribbon-like resistance heating element 242 is wound around the bimetal strip 236 and is insulated therefrom by suitable insulating material such as mica strips 244. One end 246 of the strip is clamped between a pair of nuts 248 (Fig. 3) on the screw 228 and thereby is electrically connected to the contact carrying leaf 226. The other end 252 of the resistance heating strip 242 is secured by means of a pair of nuts 253 (Fig. 1) to the screw 218 and is thereby electrically connected to the contact carrying leaf 216.

The frame 180 is further provided with a pin or stud 258 (Fig. 8) in the wall 186. An angle bracket 260 is pivotally mounted on this stud by means of an elongated bronze bushing 262 extending from the side of the bracket 260 and fitting over the stud (Figs. 3 and 6). The angle bracket is provided with a depending tail 264 (Figs. 4, 6, 7 and 8) and a coil spring 266 is stretched between this tail and a lug 268 extending lateral from the frame wall 186. This spring normally urges the bracket in a counterclockwise direction as viewed in Figs. 4, 7 and 8 and rotation in this direction is limited by abutment of the horizontal flange of the bracket against an upstanding ear 270 (Fig. 4) on the forward edge of the horizontal plate 193.

An evener-like bar 272 is pivotally mounted on a stud having a wide, flat top 274 on the top flange of the angle bracket 260. The stud is fixed in the angle bracket and passes through an aperture in an ear 276 on the side of the evener-like bar 272. The bar 272 is provided at one end with an extending finger 278 positioned for engagement by the bimetal strip 236 as will be apparent hereinafter. The opposite end of the bar 272 is provided with an upstanding flange 280.

The upstanding ear 270 of the timer frame 180 (Figs. 4 and 8) is provided with a sleeve 282 (best seen in Fig. 4) extending toward the front of the toaster. A spring clip 284 is held between the ear 270 and a flange 286 on the sleeve. A stud 288 is rotatably received in the sleeve and a radial pin 290 extends outward from the stud through a spiral slot 292 in the sleeve 282. A generally hexagonal abutment member 294 is threaded onto the stud 288 and forms a sufficiently tight fit thereon to preclude accidental shifting after initial adjustment. A knob 296 of plastic or the like fits over the sleeve 282 and has a longitudinal internal slot that engages the pin 290 for rotating the stud 288. The knob is held over the sleeve by the ends 298 of the clip 284 which fit into an annular groove in the knob. The knob preferably is knurled for ready rotation by the fingers and extends through an opening 300 (Fig. 2) in the toaster casing to permit manual adjustment of the degree of brownness to which toast is to be done.

A tappet 302 (Figs. 1, 2, 7, 8, 10 and 11) is mounted for limited vertical sliding movement on the carriage 46, and is in the form of a plate 304 having a pair of short, vertical slots 303 receiving the rivets 48 mounting the right-hand toast carrier 42 on the fingers 82 of the carriage 46. The rivet-in-slot connection allows limited sliding movement of the tappet 302 relative to the carriage 46. The tappet normally is urged to its lowest position relative to the carriage by a coil spring 306 stretched between an ear 308 on the tappet, and the lower of the rivets 48.

The tappet further includes a downward extending finger 310 aligned with the flat head 274 of the stud mounting the evener-like bar 272 on the angle bracket 260, for abutting it, the flat head thus forming a movable stop. The tappet carries an insulating member 312 of porcelain or the like mounted on a stud or rivet extending out from the finger 310. The insulating member 312 is arranged to engage the switch actuating arm 206 of the contact carrying leaf 200 as will be apparent presently.

The electric circuit of the toaster is shown schematically in Fig. 9. The several toasting heater windings 28 are indicated as a single resistor. The circuit extends from the lower one of the two terminals 314 in Fig. 9, through the toasting heaters 28, to switch blade 200. Thence it may extend either through upper switch blade 216 and bimetal heater 242 or through lower switch blade 226, and then to the other power terminal 314.

When the toaster is idle the parts are mechanically in the position shown in Figs. 1 and 2, and the electric circuit is open as shown in Fig. 9. Bread slices are placed on one or both of the toast carrying trays 42 and the handle 114 is pushed down to cause the tooth (not shown) of the catch 122 to engage beneath the shank 138 of the hook 132 as the hook tooth 142 engages beneath the roller 164, all as set forth hereinbefore.

As the carriage is so lowered by depression of the handle 114, a depending tab 320 (Figs. 2, 7 and 8) on the lowermost finger 82 engages the porcelain button 224 on the upper spring leaf 216 as shown in Fig. 6. This bends the leaf down to bring the contact button 222 into engagement with the contact button 210. This action closes a series circuit (Fig. 9) through the bimetal heater strip 242, the contact leaves 216 and 200, and the toasting windings 28. This starts the bread toasting and starts the heating and deflection of the bimetal strip 236.

When the carriage is lowered as just described, the depending finger 310 of the tappet 302 abuts the flat head stud or stop 274 carried by the pivotally mounted angle bracket 260, which thereby arrests downward motion of the tappet with the insulating member 312 just free of the actuating arm 206 of the leaf 200. The tappet 302 thus is raised somewhat from its normal position relative to the remainder of the carriage, and additional tension is applied to the spring 306.

After a predetermined deflection of the bimetal strip 236 the deflected tip 238 thereof engages the finger 278 of the evener-like bar 272 which then pivots about its mounting stud 274 until the flange 280 engages the abutment member 294 on the stud 288 as shown in Fig. 4.

The time at which this occurs, and hence the toasting time, can be varied within limits by rotation of the knob 296 and consequent axial shifting of the stud 288.

When the flange 280 engages the abutment member 294, the motion of the flange is substantially arrested. The bar 272, driven by bimetal 236, then pivots about the flange and abutment 294 as a fulcrum, and swings the angle bracket 260 about its pivotal mount 261, 262. This motion carries the stop 274 from beneath the tappet 302 which then drops under the influence of the spring 306, as shown in Fig. 7, so that the insulating member 312 pushes the actuating arm 206 down to shift the leaf 200 down to move the contact button 210 away from the contact button 222, and the contact button 208 into engagement with the contact button 230.

Referring again to Fig. 9, it can be seen that with contacts 210 and 222 separated and the circuit closed at 208—230, the resistance heater 242 for the bimetal strip is removed from the circuit, while the toasting coils 28 remain energized. The bread thus continues to toast, but the bimetal strip 236 cools off and straightens out toward its initial position.

When the carriage was lowered, the trip member 168 abutted the top of the actuating member 240 (on the bimetal 236) and pivoted in a counterclockwise direction. As the bimetal strip was heated and curved inward toward the dotted line position shown in Fig. 5, the trip member 168 was allowed to drop to its normal horizontal position under the influence of the spring 172. As the cooling bimetal strip now returns toward its original position, the end of its actuating member 240 abuts the trip member 168 and pivots the lever 104 outward away from the carriage 46 and removes the tooth (not shown) of the catch 122 from beneath the shank 138 of the hook 132. The hook 132 turns counterclockwise to remove the tooth 142 from beneath the roller 164 so that the carriage is no longer held down. This allows the spring 104 to return the carriage to its original raised position, thus raising the toast carriers 42 and the toasted bread to a position in which the toast can be grasped with the fingers for removal from the toaster. Initial upward movement of the carriage is rather rapid until the horizontal flange of the angle bracket 86 engages the clip 98 on the piston rod 90 of the dash pot mechanism 92. This retards the rising of the carriage and the toast trays so that there is no shock to the mechanism as it reaches its uppermost position, and the toast is not thrown from the toaster. It will be understood that the dash pot piston rod 90 was lowered from the position shown in Fig. 1 upon depression of the carriage.

The carriage, in moving up, carries the tappet 302 with it for releasing contact leaf 200 and bracket 260. This action accordingly opens the circuit and restores the apparatus to its initial positions shown in Figs. 1, 2 and 9. The toaster as a whole, and particularly the oven and the bimetal strip 236, are warmer than they were initially. The higher initial temperature of the bimetal and toaster will shorten a subsequent operation of the timer to compensate for faster toasting in the initially heated oven.

The carriage can be raised manually to discontinue the toasting operation at any time without waiting for the automatic toasting cycle to be completed. This is effected merely by pulling out on the handle 114 to pivot the lever 104 in the same manner as it was pivoted by the cooling bimetal strip.

It will be seen that the tappet 302 on the movable carriage and its stop 274 moved by the lever 272 provide a simple, novel and effective mechanism for operating the contacts of the thermal timer of the toaster. It will be seen also that all of the parts of the thermal timer are supported on the rigid frame 180 except for the tappet 302 and flange 329, so that the thermal timer can be preassembled as a unit and then readily mounted in the toaster by the simple expedient of a pair of screws. The entire mechanism is simple and reliable and easy to assemble and adjust.

It will be understood that the particular form of my invention shown and described is for illustrative purposes, and it further will be understood that the thermal timer can be used with latch mechanisms other than the specific latch mechanism disclosed. The invention, therefore, is to be limited only by the scope of the appended claims.

I claim:

1. An automatic electric toaster comprising a toasting compartment, electric resistance heating means for said compartment, a substantially vertically shiftable toast carrier in said compartment for shifting bread slices to and from toasting position, a carriage attached to said carrier, means for mounting said carriage for substantially vertical reciprocable movement, means for lowering said carriage to shift a bread slice on said carrier into toasting position in said toasting compartment, a bimetal thermostatic strip having a free end portion movable in substantially opposite directions upon heating and cooling of said bimetal strip, a heater for said bimetal strip, electric connections for supplying electric energy to said toaster, an upper resilient switch contact carrying member positioned beneath said carriage, a switch contact on the under side of said member, an insulating section on top of said upper contact carrying member, means connecting said upper contacting member to said heater, a lower substantially fixed contact carrying member, a switch contact on the top of said lower contact carrying member, means connecting said lower contact carrying member to the other end of said heater, an intermediate resilient contact carrying member, a contact on the top of said intermediate member in alignment with the contact on the upper contacting member, a contact on the bottom of the intermediate member and aligned with the contact on the bottom member, means connecting one of said upper and lower members to said electric connections and the other to the compartment heating means, means for connecting the compartment heating means to said electric connections, a portion on said carriage fixed relative to said carriage and aligned with the insulating section on the upper member to abut and deflect said upper member down to bring the contact carried thereby into engagement with the contact on top of the intermediate member for energizing said compartment heating means and said heating coil, a tappet carried by said carriage and mounted for limited up and down movement relative thereto, resilient means urging said tappet down on said carriage, a movable stop aligned with said tappet for arresting downward movement of said tappet before said carriage reaches its lowermost position, means effective upon predetermined movement of the free end portion of said bimetal strip to move said movable stop from beneath said tappet to allow said resilient means to move said tappet down, an insulating member on said tappet engageable with the intermediate contact carrying member upon such downward movement of said tappet to deflect said intermediate member to bring the contact on the bottom thereof into engagement with the contact on the lower contact carrying member to deenergize said heater, the cooperating contacts on the upper and intermediate members moving out of engagement and said compartment heating means remaining energized, and means effective upon predetermined return movement of the end portion of said bimetal strip to raise said carriage to move toast to nontoasting position and to allow all of said contacts to separate.

2. An automatic electric toaster as set forth in claim 1 wherein the movably mounted stop is carried on a pivotally mounted bracket and the means for moving said stop from beneath the tappet comprises an elongated member pivotally mounted on the stop and having arms extending in opposite directions therefrom, one of said arms being contacted by the end of said bimetal strip as the strip deflects with heating, and a manually adjustable abutment engageable with the oppositely extending arm for adjustably limiting pivotal movement of said elongated member to cause said bimetal strip and said elongated member to pivot the bracket carrying the stop.

3. In combination in a timer, a frame, a movable timing member, means movably supporting said timing member on said frame, a trip member, means movably mounting said trip member on said frame, a lever pivotally supported from said frame and having a part engaging said trip member, said timing member acting against another part of said lever for swinging said lever, a fulcrum carried by said frame and engageable by another part of said lever, said timing member moving said lever to swing it into simultaneous engagement with said trip member and fulcrum and then to move said trip member as said lever pivots about said fulcrum, and means for adjusting the position of said fulcrum to alter the position to which said timing member must move for moving said trip member.

4. The combination of claim 3 wherein said lever is pivotally mounted on said trip member.

5. The combination set forth in claim 4 and further including a bracket and means mounting said bracket on said frame for pivoting of said bracket, said trip member and said lever being pivotally mounted on said bracket.

6. An automatic electric toaster comprising in combination, a frame, means providing a toasting compartment supported by said frame, a toasting heater for said compartment carried by said frame, a carriage, means mounting said carriage on said frame for reciprocating movement, toast-moving means connected to said carriage to move said carriage for moving bread into and out of said toasting compartment in response to said reciprocating movement of said carriage, a thermal timer of the heat-up cool-off type carried by said frame and including double acting thermomotive means movable in a predetermined cycle in response to the application of heat thereto, electric timer-heating means mounted in heating relation to said thermomotive means for heating thereof, electric power supply connections carried by said frame, means including a plurality of switch contacts carried by said frame for selectively closing circuits through said compartment heater and said timer-heating means from said power supply connections, means on said carriage for operating said switch contacts, said switch operating means including means for moving one pair of said contacts into engagement for energizing said toasting heater and said timer-heating means in response to a movement of said carriage for moving bread into said toasting compartment, said switch operating means also including a tappet carried by said carriage and mounted for limited shifting movement thereon, biasing means for said tappet, a stop, means movably carrying said stop on said frame and normally aligned with said tappet, said carriage carrying said tappet into abutment with said stop, said tappet when so moved into abutment with said stop being shifted on said carriage against the action of said biasing means by further movement of said carriage, said stop carrying means being operatively engageable by the thermomotive means of said thermal timer when said timer-heating means is energized to move said stop out of alignment with said tappet for initiating movement of said tappet under force of said bias means, said movement of said tappet opening said first pair of contacts and closing a second pair thereof for deenergizing said timer-heating means while continuing energization of said toasting heater, and means responsive to movement of said movable means of said thermal timer resulting from changed energization of said timer-heating means for moving said carriage out of said toasting position, and for opening all of said switch contacts for deenergizing said toasting heater.

References Cited in the file of this patent

UNITED STATES PATENTS

| | | |
|---|---|---|
| 2,266,024 | Gomersall | Dec. 16, 1941 |
| 2,303,561 | Koci | Dec. 1, 1942 |
| 2,378,073 | Felver et al. | June 12, 1945 |
| 2,549,094 | Huck | Apr. 17, 1951 |
| 2,566,905 | Palmer | Sept. 4, 1951 |
| 2,624,268 | Horvath | Jan. 6, 1953 |
| 2,641,993 | Morphy et al. | June 16, 1953 |